Dec. 14, 1965  T. E. BASTIS  3,222,785
KNIFE

Filed Nov. 22, 1963  2 Sheets-Sheet 1

INVENTOR.
THOMAS E. BASTIS
BY *James E. Cooney*
ATTORNEY

Dec. 14, 1965    T. E. BASTIS    3,222,785
KNIFE
Filed Nov. 22, 1963    2 Sheets-Sheet 2
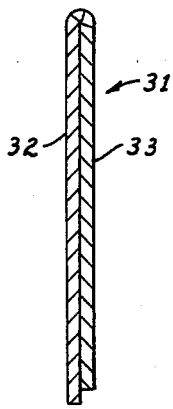
FIG_4
FIG_5
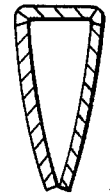
FIG_6
FIG_7
FIG_8
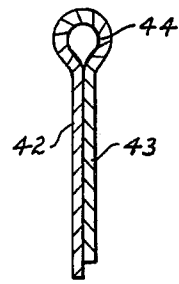
FIG_9
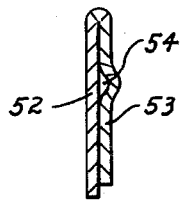
FIG_10
INVENTOR.
THOMAS E. BASTIS
BY James E. Cooney
ATTORNEY United States Patent Office 3,222,785
Patented Dec. 14, 1965

3,222,785
KNIFE
Thomas E. Bastis, Oakland, Calif., assignor to Kaiser Aluminum & Chemical Corporation, Oakland, Calif., a corporation of Delaware
Filed Nov. 22, 1963, Ser. No. 325,542
4 Claims. (Cl. 30—355)

This invention relates to a knife, and particularly to a knife that is inexpensively made from a single piece of sheet metal.

Although this invention is not limited to knives employed for any particular purpose, it is particularly useful for preparing knives of inexpensive material which may be made so inexpensively that they can be disposed of after a single use. For many purposes, such as for use in airplanes, for picnics and in other circumstances where kitchen facilities are not available or are inadequate to provide clean and sterile eating utensils, disposable eating utensils are desirable. Plastic forks, spoons and knives are familiar, but these are unsatisfactory because they are brittle, not strong or hard enough and not sharp. These plastic utensils are at best usable only with food such as ice cream or salad that is not too hot, tough or hard, put they are thoroughly unsatisfactory with regular food such as meat, baked potatoes, etc., where some strength and heat resistance are desirable. Until now, only metals have adequate properties for general use eating utensils, but metal eating utensils are too expensive to be disposable.

Thin-gauged and inexpensive metals, such as aluminum, can be used for forks and spoons but the design criteria for knives makes it difficult to employ inexpensive materials. Knives must have a thin sharp blade that is strong and a thick handle that is comfortable to manipulate. Two ways are commonly employed for making such utensils. One is to employ a piece of metal thick enough to make a handle and to forge a thin blade portion from part of it. This forms a knife from a single piece of metal. Another method is to employ a hollow handle to which a thin blade is permanently attached. Both of these methods require materials and processing steps that are too expensive for use with inexpensive disposable utensils.

It is an object of this invention to provide a knife of inexpensive metal, such as aluminum of relatively thin gauge, which is strong enough to be employed as a satisfactory knife but which is formed of a single unitary piece of sheet metal which is substantially of the same thickness throughout.

Another object of this invention is to provide a sheet metal blank that may easily be formed into a serviceable knife.

These objectives and others are accomplished by the present invention which provides a low-cost metal knife, for example, of aluminum which is formed entirely from a unitary piece of sheet metal the same gauge or thickness throughout. The knife of this invention is formed from a blank that may be punched from a sheet. The blank is prepared from sheet material to have a blade precursor portion which is wider than the rest of the blank and a handle precursor portion which is narrower than the blade precursor portion. The handle precursor portion may be regular in its shape or it may be tapered to provide various styles to the ultimate finished knife. The handle precursor portion is symmetrical about a longitudinal axis and the blade precursor portion preferably is asymmetrical about that axis.

The knife of this invention is formed by bending the blank described above. The blade portion is formed by bending the blade precursor portion so that it forms, in cross section, a sharply bent U shape with one surface bent back upon itself so that the entire surface, or almost the entire surface, is in contact with other parts of that same surface. The blade is bent so that one leg of the U extends slightly beyond the other, and the extended portion is prepared to have a cutting edge, either by sharpening or by forming serrations in the blank.

The handle precursor portion is formed into a handle by being bent, in cross section, into a hollow, closed configuration. Preferably, the handle in cross section is bent to a relatively large diameter configuration and it is not necessary that the rear end be enclosed although a tab may be formed on the bank so that it may be bent over the opening at the rear of the handle. The handle portion is made to have no sharp edges and to be large enough in all dimensions for easy manipulation.

By the use of this invention, a knife can be made of inexpensive thin gauge sheet material but it will be stiff, comfortable to use, constructed to cut but still having the desirable ductile metal properties.

The accompanying drawings show various embodiments of this invention but are presented to be illustrative rather than limiting on the scope of the invention.

FIG. 4 is a cross-sectional view of the knife illustrated in FIG. 2 taken along the line 4—4;

FIG. 5 is a cross-sectional view of the knife illustrated in FIG. 2 taken along the line 5—5;

FIG. 6 is a cross-sectional view of the knife illustrated in FIG. 2 taken along the line 6—6;

FIG. 7 is a cross-sectional view of the knife illustrated in FIG. 2 taken along the line 7—7;

FIG. 8 is a cross-sectional view of the knife illustrated in FIG. 2 taken along the line 8—8;

FIG. 9 is a cross-sectional view of an alternative blade configuration embodying this invention; and FIG. 10 is a cross-sectional view of another alternative blade configuration embodying this invention.

Figure 1:
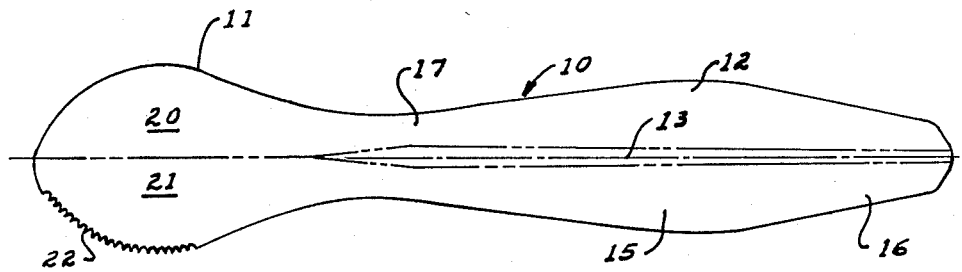
FIG. 1 illustrates a blank embodying this invention which is suitable for forming into a knife.

Referring particularly to FIG. 1, there is illustrated a blank 10 consisting of a blade precursor portion generally designated 11 and a handle precursor portion generally designated 12. A longitudinal axis 13 is illustrated although this axis will not be visible on the blank itself or on the completed knife. The handle precursor portion 12 illustrated in FIG. 1 has a wide middle section 15, a narrow end section 16 and a narrow section 17 connecting the handle to the blade precursor portion 11. Sections 15, 16 and 17 are all symmetrical about longitudinal axis 13 and the variations in the width of these sections is for the purpose of providing a particular style to the ultimate knife that is prepared, as will be shown in subsequent drawings.

The blade precursor portion 11 consists of portion 20 and portion 21 which extend asymmetrically about the longitudinal axis 13. Portion 21 extends farther from axis 13 than portion 20, and at least part of the periphery of portion 21 is prepared with a cutting edge illustrated here as serrations 22.

FIGS. 2–8 illustrate various views of a knife prepared from the blank illustrated in FIG. 1. The knife consists of a handle generally designated 30 and a blade generally designated 31. The blade is formed by bending the blade precursor portion of the blank into a sharp U shape to form, in cross section, legs 32 and 33, leg 32 extending beyond leg 33 by a short distance. Leg 32 is prepared with a cutting edge, such as the serrations 22, over the portion of the blade 31 that will be employed for cutting. Portions of the periphery, such as portion 35, which is the tip that will not be employed for cutting, or portion 36, which is the area blending into the handle 30, need not be serrated since serrations at those points will perform no function. Legs 32 and 33 may be simply in contact with each other. In the form shown they will act as a double sheet thereby increasing the strength of the blade 31. However, the extended portion of blade 32 is so short that it will not buckle when employed as a knife but it will still provide a sharp edge for cutting. The legs 32 and 33, where desired, may be connected to each other by welding, brazing, soldering or by the use of cements or adhesives. Also, where desired, the edges of the blade precurser portion 11 may be tapered so that there is no sharp step-wise configuration at the cutting portion of the blade 31.

Figure 2:
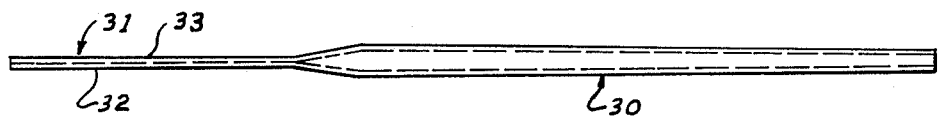
FIG. 2 illustrates a knife embodying this invention which was formed from the blank of FIG. 1.
Figure 3:
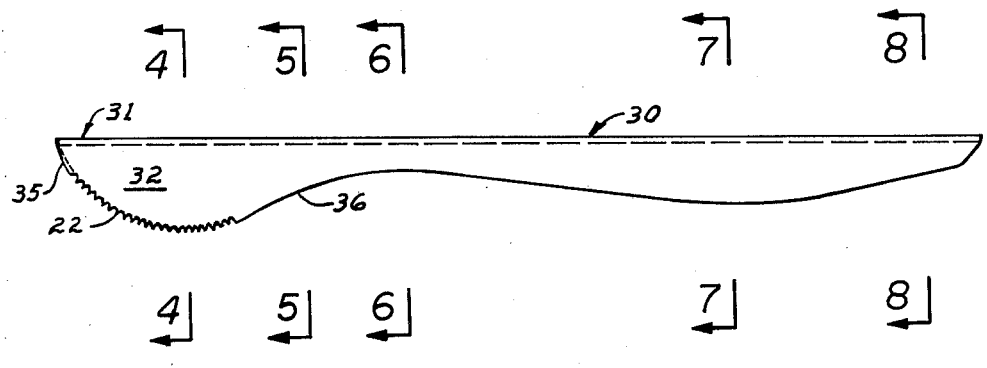
FIG. 3 illustrates a bottom view of the knife illustrated in FIG. 2.

FIG. 5 illustrates the cross section of FIG. 2 where the blade portion begins merging into the handle portion. Although the cross section shown in FIG. 5 is in the form of a sharp U with surfaces in contact, it is evident that this portion of the blade is not employed in cutting or even in such functions as butter spreading. The blank illustrated in FIG. 1 is bent so that shortly toward the handle from FIG. 5 a hollow configuration approaching that shown in FIG. 6 is formed. It may be noted that the handle 30 is formed with a generally triangular configuration with rounded comfortable bends so that handling and manipulating the knife will not cause discomfort. The handle portion, as illustrated in FIG. 3, is styled to taper slightly from the blade toward the rear portion of the handle, and, as illustrated in FIG. 2, it is styled to taper from the blade toward the center, becoming wider, and then to taper from the center toward the end, becoming narrower.

FIGS. 6, 7 and 8 illustrate that the hollow configuration of the handle in this embodiment is always in the general form of an isosceles triangle, but the triangle has a broader base near the blade, a narrower base as it approaches the end of the handle, and the equal-length legs become longer and then shorter as the handle progresses from the blade toward the end.

FIG. 9 illustrates a cross section embodying a different blade configuration. The embodiment illustrated in FIG. 9 shows a blade having legs 42 and 43, leg 42 extending beyond leg 43 for the purpose of providing a cutting edge, as discussed with regard to FIGS. 1–8. FIG. 9, however, instead of having the blade formed from a sharply bent U is formed with a small diameter hollow configuration 44 on the edge opposite the cutting edge. This configuration provides to the blade rigidity in the direction transverse to its flat surfaces. FIG. 10 illustrates another means of providing such rigidity by providing a hollow configuration in the center portion of the blade. In FIG. 10, a leg 52 extends beyond a leg 53 and the leg 53 has within it a longitudinal groove which forms, in cross section, a hollow configuration 54. The blade also may be provided with such hollow configurations running from the cutting edge to the opposite edge to give rigidity in that direction as well when so desired A knife made in accordance with this invention was prepared from 5052 aluminum, which is an alloy of aluminum containing magnesium and silicon as well as other elements and rolled into a sheet 0.024 inch thick, after which it is annealed back to one-fourth maximum work hardness, which is called an H–32 temper. The blade precursor portion of the blank was asymmetrical, one portion extending a maximum of approximately $\frac{1}{32}$ inch further from the axis than the other portion, and gradually becoming symmetrical about the axis as the tip of the blade and the handle are approached, the handle portion smoothly blended from the flat blade configuration to a rounded hollow configuration having, in cross section, an isosceles triangular shape.

In use, it was found that the double thickness blade was more than adequately strong for a table knife, that the single thickness extension with a serrated edge was more than adequately sharp for ordinary table use, and that the hollow handle was comfortable and easy to use. Although it is quite subjective, the "feel" or balance of the knife was very good, and this effect is thought to be achieved by using approximately the same amount or weight of metal in the handle as is used in the blade.

What is claimed is:

1. A knife comprising a unitary sheet of foldable metal having a blade portion and a handle portion, said blade portion formed by a portion of said sheet including a U-shaped cross section wherein the legs of the U are in contact with each other and one leg of said U extends beyond the other, the extending portion of said one leg being provided with a cutting edge, and said handle portion being formed by another portion of said sheet being of a closed hollow configuration.

2. The knife of claim 1 wherein said blade contains a relatively small hollow configuration remote from the extending portion of said leg.

3. The knife of claim 1 made from a unitary sheet of aluminum alloy of the magnesium silicide type annealed to one-fourth of maximum work hardness.

4. The knife of claim 1 wherein said handle portion has a cross-section of closed triangular shape.

References Cited by the Examiner

UNITED STATES PATENTS

| | | | |
|---|---|---|---|
| 303,308 | 8/1884 | Miller | 30—165 |
| 1,541,307 | 6/1925 | Zinn | 30—348 |
| 1,727,648 | 9/1929 | Jarvis | 30—348 |
| 2,285,013 | 6/1942 | Burns | 30—165 |
| 2,294,096 | 8/1942 | Rice | 30—165 X |
| 2,551,256 | 5/1951 | Foltis | 30—47 |
| 2,941,292 | 6/1960 | Mirando et al. | 30—165 |

WILLIAM FELDMAN, *Primary Examiner.*